United States Patent
Gorti et al.

(10) Patent No.: US 8,634,425 B2
(45) Date of Patent: *Jan. 21, 2014

(54) PROFILE SHARING ACROSS PERSONA

(75) Inventors: Sreenivasa Rao Gorti, Austin, TX (US); Anil Kumar Doradla, Austin, TX (US); David Wolter, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1634 days.

This patent is subject to a terminal disclaimer.

(21) Appl. No.: 11/588,924

(22) Filed: Oct. 27, 2006

(65) Prior Publication Data

US 2007/0121869 A1 May 31, 2007

Related U.S. Application Data

(63) Continuation-in-part of application No. 11/267,420, filed on Nov. 4, 2005.

(51) Int. Cl.
*H04L 12/28* (2006.01)
*H04L 12/56* (2011.01)

(52) U.S. Cl.
USPC ............. 370/395.43; 370/395.41; 370/395.42

(58) Field of Classification Search
None
See application file for complete search history.

(56) References Cited

U.S. PATENT DOCUMENTS

| | | | |
|---|---|---|---|
| 6,026,291 A | 2/2000 | Carlsson et al. | |
| 6,212,372 B1 | 4/2001 | Julin | |
| 6,542,733 B1 | 4/2003 | Dennis | |
| 6,574,467 B1 | 6/2003 | Jonsson | |
| 6,591,105 B1 | 7/2003 | Hussain et al. | |
| 6,603,969 B1 * | 8/2003 | Vuoristo et al. | 455/433 |
| 6,657,992 B1 | 12/2003 | Christie, IV | |
| 6,771,757 B1 | 8/2004 | Torkki | |
| 6,978,156 B1 | 12/2005 | Papadopoulos et al. | |
| 6,999,763 B2 | 2/2006 | Ramalho et al. | |
| 7,136,469 B1 * | 11/2006 | Ravindranath et al. | 379/114.01 |
| 7,603,109 B2 | 10/2009 | Barone et al. | |
| 2002/0037723 A1 | 3/2002 | Roach | |
| 2003/0149781 A1 | 8/2003 | Yared et al. | |
| 2004/0102182 A1 | 5/2004 | Reith et al. | |
| 2004/0196796 A1 | 10/2004 | Bajko et al. | |
| 2005/0009520 A1 * | 1/2005 | Herrero et al. | 455/435.1 |
| 2005/0027867 A1 | 2/2005 | Mueller et al. | |
| 2005/0037746 A1 * | 2/2005 | Ramalho et al. | 455/422.1 |
| 2005/0065801 A1 | 3/2005 | Poikselka et al. | |
| 2006/0123116 A1 | 6/2006 | Rahman et al. | |
| 2007/0058569 A1 * | 3/2007 | McMenamin et al. | 370/254 |
| 2007/0081519 A1 * | 4/2007 | Ramaswamy et al. | 370/352 |

FOREIGN PATENT DOCUMENTS

WO   WO 99/27723   6/1999

OTHER PUBLICATIONS

Office Action dated Nov. 10, 2009, for U.S. Appl. No. 11/267,420.

* cited by examiner

*Primary Examiner* — Jae Y Lee

(57) ABSTRACT

The embodiments disclosed include a system and method for sharing services between service profiles on a single telecommunications device resulting in improved ease of access for a user who wishes to access services through different service profiles. The user can access services in multiple service profiles with a single device. In one embodiment, the techniques described below are enabled through a Session Initiation Protocol ("SIP")-based next-generation network ("NGN"), such as the IP Multimedia Subsystem ("IMS") architecture.

20 Claims, 7 Drawing Sheets

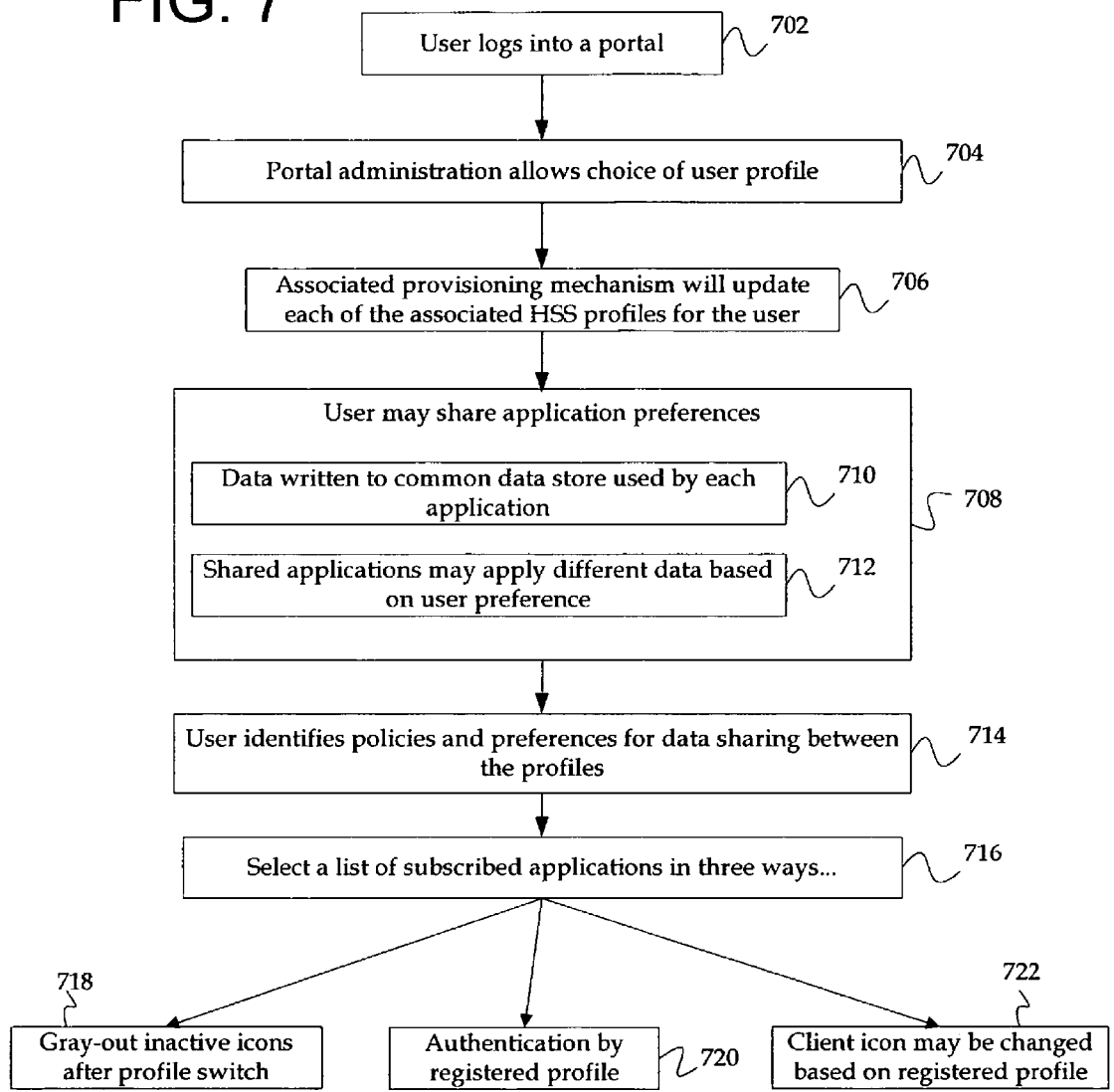

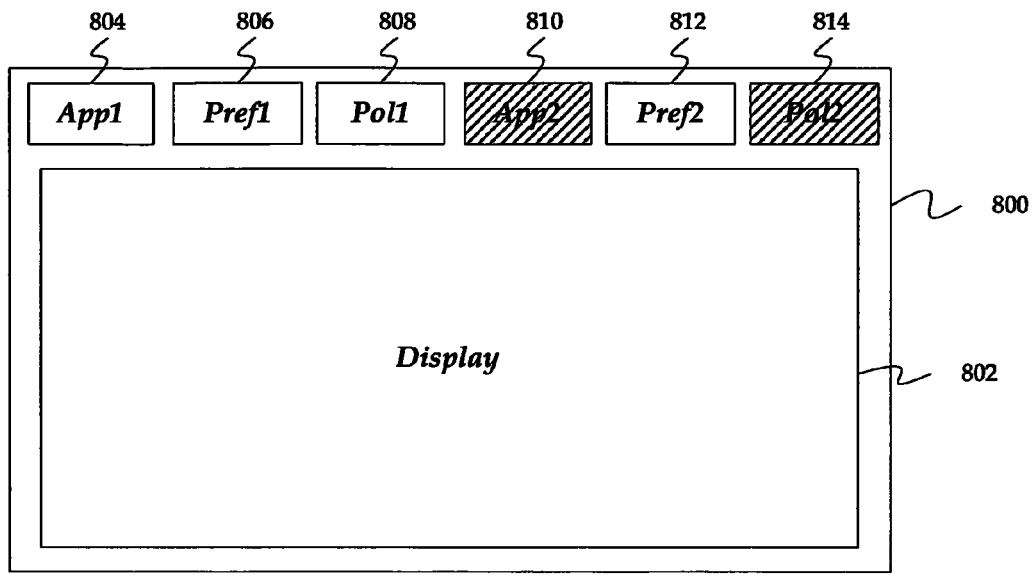
FIG. 8  Service Profile 1
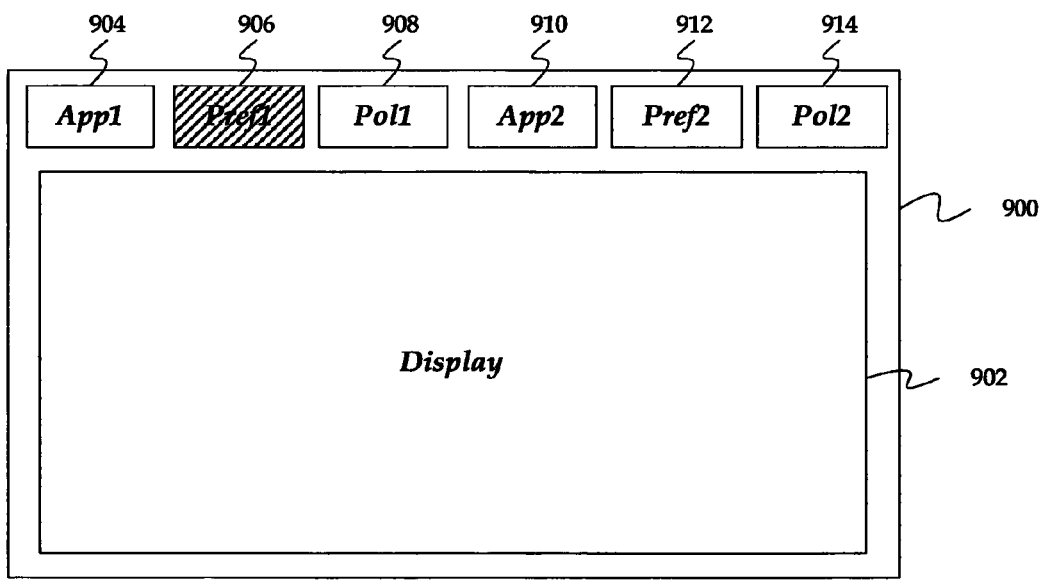
FIG. 9  Service Profile 2

PROFILE SHARING ACROSS PERSONA

RELATED APPLICATIONS

This application is a continuation-in-part application of U.S. application Ser. No. 11/267,420 (8285/768) (pending), entitled "ENABLING MULTIPLE SERVICE PROFILES ON A SINGLE DEVICE," filed Nov. 4, 2005, which is incorporated herein by reference.

BACKGROUND

Traditional telephony service profiles are typically associated with devices, not users. The device (and device identity) may be used as a proxy for the user. Traditional telephony services associated with a particular device are then usually tied to a particular service profile. For example, when a mobile device registers with a network, the authentication/authorization process verifies the user's authentication credentials and may attach a service profile to the device based on the Home Location Register ("HLR")-provisioned information for the user. The HLR is a central database that contains details of each subscriber that is authorized to use the core network. Similar approaches are being adopted on the new Voice over IP ("VoIP") environments—the Session Initiation Protocol ("SIP") registration of the device associates the user with a particular service profile. SIP is a protocol developed by and proposed standard for initiating, modifying, and terminating an interactive user session that involves multimedia elements.

SIP-based next-generation networks ("NGN") are becoming more common in the telecommunications industry. Specifically, the IP Multimedia Subsystem ("IMS") network is SIP-based NGN for fixed IP and for mobile services. An IMS-based VoIP implementation uses SIP and runs over the standard Internet Protocol ("IP"). SIP is the signaling protocol of the IMS architecture. IMS offers a wide-range of different services, but users may have limited access or flexibility with the set of services available. As IMS or other SIP-based NGNs are likely to become more common in the future, a user will want flexibility in the types of services offered through the architecture.

BRIEF DESCRIPTION OF THE DRAWINGS

The components and the figures are not necessarily to scale, emphasis instead being placed upon illustrating the principles of various embodiments.

FIG. 7 is a flow diagram illustrating a method according to an embodiment;

FIG. 8 is a diagram illustrating one embodiment of a user interface;

FIG. 9 is a diagram illustrating one embodiment of another user interface; and

DETAILED DESCRIPTION

Figure 1:
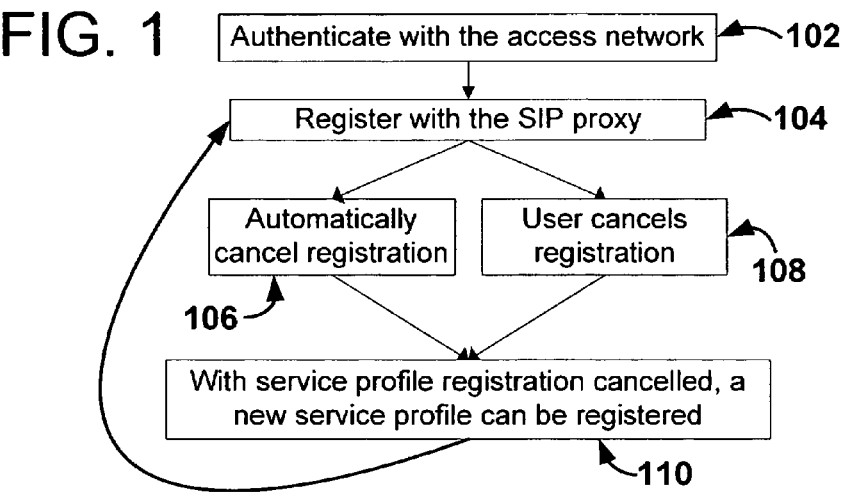
FIG. 1 is a flow diagram illustrating a method according to an embodiment.

By way of introduction, the embodiments described below include a method for enabling multiple service profiles for improved flexibility for a user who wishes to access different services through multiple service profiles. The user can access multiple service profiles with a single device, and therefore switch the set of services offered to the device. This allows for automatically switching through a profile configured on the user agent. The user can manually switch the profiles or intelligence in the device can perform this switch based on preferences, profile, time of day, location, etc. In addition, the services that are available in one service profile may be available in another service profile. This sharing of services may allow a user to avoid persistent switching between service profiles. In one embodiment, the techniques described below are enabled through any Session Initiation Protocol ("SIP")-based next-generation network ("NGN"). One example of a SIP-based NGN is the IP Multimedia Subsystem ("IMS") architecture.

In a first aspect, a method is provided for sharing available services between multiple service profiles on a device in a Session Initiation Protocol ("SIP") based network. The method includes receiving a first service profile and a second service profile for the device, wherein the first service profile is associated with a first set of services and the second service profile is associated with a second set of services. A registration of the device is received with one of the first service profile or the second service profile. A first service from the first set of services is provided with the second profile if the second service profile is registered or a second service from the second set of services is provided with the first service profile if the first service profile is registered.

In a second aspect, a communications system is provided including at least one telecommunications device and a Session Initiation Protocol ("SIP")-based network operative to receive registration from a first profile or a second profile of the at least one telecommunications device, the first profile comprising a first set of services and the second profile comprising a second set of services, wherein at least one service in the second set of services is available with the first profile and the second profile.

In a third aspect, a computer-readable medium for sharing services between persona includes providing a first persona and a second persona, wherein the first persona is associated with a first set of services and the second persona is associated with a second set of services. A registration is received for one of the first persona or the second persona. A service is shared from the second set of services with the first persona if the registration is for the first persona, or a service is shared from the first set of services with the second persona if the registration is for the second persona.

Other systems, methods, features and advantages will be, or will become, apparent to one with skill in the art upon examination of the following figures and detailed description. It is intended that all such additional systems, methods, features and advantages be included within this description, be within the scope of this disclosure, and be protected by the following claims and be defined by the following claims. The present disclosure is defined by the following claims, and nothing in this section should be taken as a limitation on those claims. Further aspects and advantages are discussed below in conjunction with the embodiments.

Multiple service profiles may be associated with a single user device and the set of services offered to the device may be unique to each service profile. A single user can "switch persona" as they move from a work environment to a home environment. Persona may be used to describe a service profile or profile. For example, consider that a user's device is associated with his/her office services (delivered either through a PBX or a hosted Centrex solution). The user is able to access various telephony services associated with this "service profile", for example 4-digit dial, conferencing, network-address book, etc. However, when the user is traveling, the same device may be associated with his/her "personal" service profile (for example, distinctive ringing, simultaneous ringing with a home telephone, etc).

Although a user may have different persona, there may be a need to share different aspects of that persona. The embodiments describe a mechanism for sharing services between service profiles or personas. In particular, applications, preferences, policies and data may be shared between service profiles. The services available on a personal profile may be made available on a work profile. Accordingly, the user may transition between persona throughout the day and retain the benefits of sharing information, such as contacts, or applications.

FIG. 1 is a flow diagram illustrating a method according to an embodiment. As an overview, a telecommunications device is authenticated with an access network in block 102. The device is then registered with a Session Initiation Protocol ("SIP") proxy in the SIP-based network in block 104. The user can then cancel the service profile associated with the device in block 108. Alternatively, the service profile is automatically cancelled based on existing rules for the user or device in block 106. The service profile can then be switched in block 110 by re-registering a service profile in block 104. This process allows a device to switch service profiles.

Figure 2:
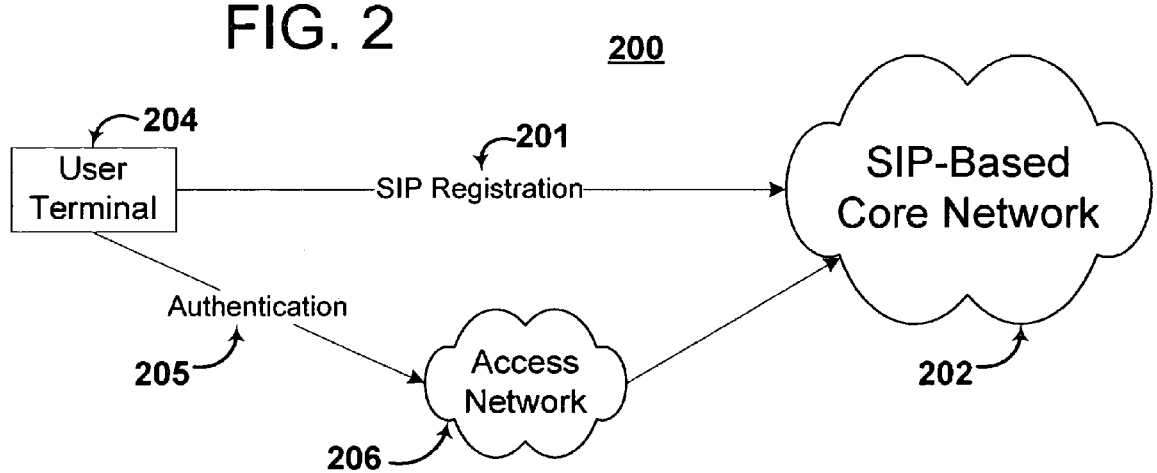
FIG. 2 is a block diagram illustrating a system according to an embodiment.

An embodiment of the system 200 is shown in FIG. 2, which is a block diagram. A user terminal 204 is authenticated 205 through an access network 206 to the SIP-based core network 202. In a separate process, the user terminal 204 is registered 201 with the SIP-based core network 202. The registration and the authentication to the SIP-based core network are separate processes. The core network may be any SIP-based network. In one embodiment, the core network may be a next generation network ("NGN").

Referring to FIG. 1, in block 102, the first step is authentication with an access network. The authentication of a device or user terminal is typically Subscriber Identity Module ("SIM") based. SIM is a single application residing in a smart card that collects user subscription information and provides secure storing of a key identifying a subscriber and also subscription information, preferences and storage of other data for a subscriber on a network. The authentication of a device can be any other access-network specific authentication. In one embodiment, the access network authentication is separate from the service profile registration to the SIP-based network. The SIP-based network may be a next generation network ("NGN"). One example of a SIP-based NGN network is an IP Multimedia Subsystem ("IMS") network.

In block 104, service profile registration is typically done through a SIP registration by a Session Initiation Protocol ("SIP") user agent ("UA"). Many SIP user agents (such as XTEN, SJPHONE, MICROSOFT MESSENGER) allow a user to configure the SIP proxy. Conceptually, it is quite simple to allow this multiple proxy support to be policy-based. This conceptually simple step may translate to significant advantages for an end-user in terms of services accessible from the device.

This service profile SIP registration on the SIP-based network is separate from device authentication. The separation allows the SIP user agent to be configured to register under different network public user identities. There is no need to re-authenticate the device when re-registering a different profile. The user agent or user terminal with multiple service profiles registers to the core network with a first service profile, while the user agent or user terminal is authenticated over an access network. The authentication over the access network may or may not be associated with the service profile. The registration follows the standard SIP REGISTER protocol, specifying the contact IP address for the user.

When a device or user terminal registers with a SIP-based network, it is associated with a service profile that is associated with a variety of different services. The service profile may also be referred to as a personality, persona, or identity associated with the device. The service profile signifies a set of services available to a particular device upon registration. The services offered differ based on the device and the network the device is registered on. The services available on a device used at work are different than those services that a user wants while at home. Examples of services available include 4-digit dial, conferencing, network-address book, distinctive ringing, simultaneous ringing with a home telephone, etc.

Referring back to FIG. 2, the system 200 has a user terminal 204 authenticating 205 with an access network 206 like in block 102 of FIG. 1. The access network 206 is connected to the SIP-based core network 202. The authentication is a separate process from the registration of the device as in block 104 of FIG. 1. In system 200, the user terminal 204 has a SIP registration 201 with the SIP-based core network 202.

A user terminal 204 is coupled with both an access network 206 and an SIP-based core network 202. The user terminal 204 is also referred to as a telecommunications device, a user agent, or a device. The user terminal 204 may include a telephone, a cellular phone, a computer, or a personal digital assistant ("PDA") or any other device able to connect to the core network.

The SIP-based network 202 may be a next generation network ("NGN") that is a multi-media architecture for fixed IP and for mobile services. One example of a SIP-based NGN network is the IMS network. The IMS network is designed to offer the same services that are currently offered through the Internet or other IP-based networks such as VoIP, videoconferencing, or other content sharing. Communication through IMS can be with voice, text, pictures, video or any combination. IMS is access independent as it supports multiple access types such as GSM, CDMA, broadband, or WLAN. IMS supports traditional telephony services and non-telephony services such as messaging and video streaming. IMS is very flexible in that it offers multiple services. Users can customize those services that they need. Any core network can support this system as long as the network authentication is separate from service registration, which is the case with SIP registration.

The registration 201 of the user terminal 204 to the core network 202 may be SIP based. SIP is an IP protocol primarily used for VoIP calls, but can be used for any type of media transfer. SIP is becoming a standard protocol for next generation networks and infrastructure. The user terminal 204 registering with the core network through a SIP-based registration is an exemplary embodiment. Other registration protocols compatible with any other SIP-based network or architecture may be used.

The access network 206 allows a user to connect to the SIP-based core network 202. Access can be accomplished through a variety of options, such as through the existing internet, mobile access such as CDMA or GSM, or wireless access. As can be seen in system 200, the authentication 205 is separate from the registration 201. The significance of this separation is that the user terminal 204 can switch between service profiles or personalities with the SIP-based network 202 independent of the authentication of the user terminal 204. As discussed above, the different service profiles or personalities are associated with different sets of services offered through the SIP-based network 202.

Referring back to FIG. 1, this switching of service profiles is shown in blocks 106, 108 and 110. A user registers with the network in block 104 with a first service profile. Then the user is able to re-register with a second service profile. In block 106, the registration of the first service profile is automatically cancelled. The automatic switching may be based on policies governing the switching. An example policy in which a profile would be automatically cancelled would be a situation when a service profile is designated for certain times of the day. A user could have a work profile available from 8:00 a.m.-5:00 p.m. and then have a personal profile from 5:00 p.m.-8:00 a.m. At 5:00 p.m. the work profile is automatically cancelled as in block 106. Then the device re-registers with the personal profile.

The policies governing automatic switching and also governing a manual switch of profiles can be established by the user. One way for the user to establish the policies governing the switching of profiles would be through a device-resident configuration graphical user interface ("GUI") allowing the user to set various preferences for either automatic or manual switching of service profiles. The user also can set a default service profile on the configuration GUI.

In one embodiment, the user has a GUI (such as PDA-based, PC-based, etc.) application that writes out a local XML configuration file that is read by the UA. On a mobile device, the GUI would be more limited, and consist of selecting options for things like "Personal—at home, Personal—away, Office, etc." The GUI or user interface may be as shown in FIGS. 8 and 9 or may include different features.

In an alternative embodiment, there may be a web page that stores the profile at a site. The configuration information could be stored at the web site, and made available to the SIP client at startup—the SIP client could be configured with a configuration URL that it links to and downloads the configuration information profile (through HTTP, TFTP, etc).

In yet another embodiment, the device may dynamically correlate explicit user selection of a profile to use with some context information, such as user location, time of day etc, and build up a history to predict which profile the user may choose at a given time. In each of these embodiments, the user may be explicitly made aware of the profile being used, through the UA display.

In an alternate embodiment, the user can manually switch profiles by canceling the current service profile as in block 108. Once the current service profile has been cancelled automatically as in block 106, or manually as in block 108, the user can then re-register with the network as in block 110. The user registers a different service profile in block 104. The user may utilize a configuration GUI to switch profiles or to choose a different profile to register with.

Figure 3:
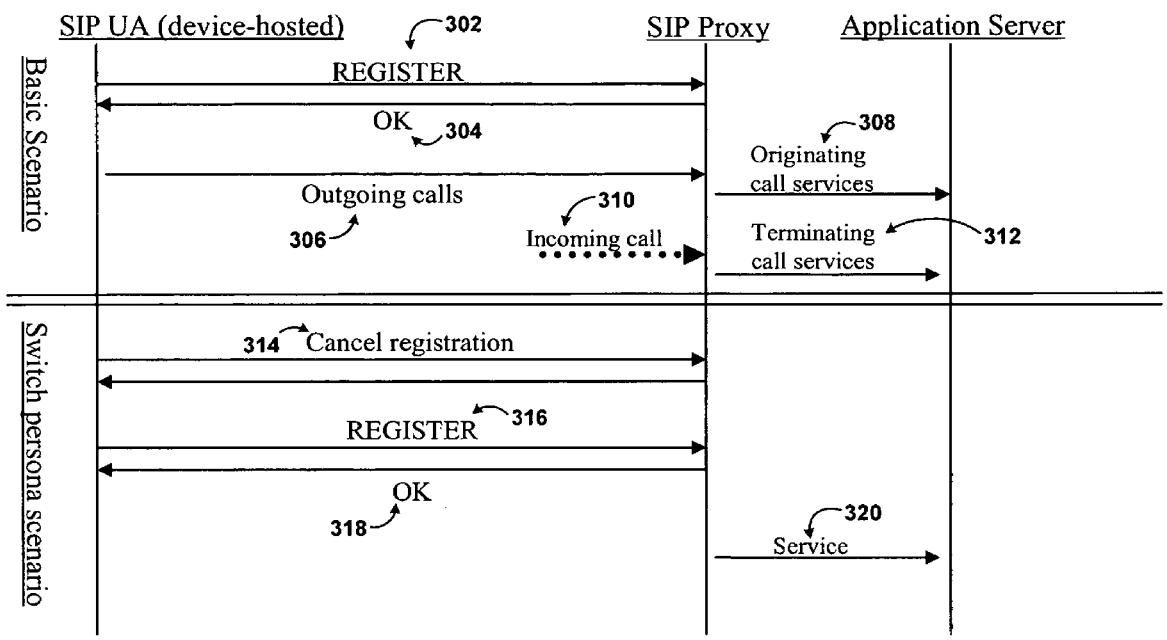
FIG. 3 is a diagram illustrating a method according to an embodiment.

Referring to FIG. 3, which is a diagram illustrating a method according to an embodiment. In particular, FIG. 3 shows scenarios for switching personas and basic call flows. Two scenarios are shown. The basic scenario that is applied in the standard case and an extended scenario that is applied on re-registration. SIP protocol messages are shown in abbreviated and conceptual form and are not meant to be descriptive of all the actual protocol messages exchanged.

The SIP UA (user agent) is the device or user terminal that the user connects from. In the basic scenario, the SIP UA registers 302 with the SIP Proxy, which verifies the registration 304. The SIP UA then makes outgoing calls 306 and receives incoming calls 310 through the SIP proxy. Originating and terminating call services 308 are registered through the application server or network.

In the switch persona scenario the SIP UA cancels the registration 314. Then upon cancellation, the SIP UA can register 316 with the SIP Proxy and the SIP Proxy recognizes the registration 318. The proxy is responsible for routing requests to the appropriate application server that provides the service. The network is any SIP-based network, such as a NGN or an IMS network. All incoming and outgoing calls end up at the proxy, and then the proxy reroutes them as necessary. This rerouting may involve service logic that is applied by one or more application servers in the network. The call is then terminated either at the called party's UA, or if an intelligent call forwarding service is applicable, to other devices like GSM device or voicemail. At the point of registering a different persona or service personal, the services 320 offered with the application server are different. FIG. 3 is showing outgoing (originating) call servers, however, the same call flow may apply to incoming calls.

Figure 4:
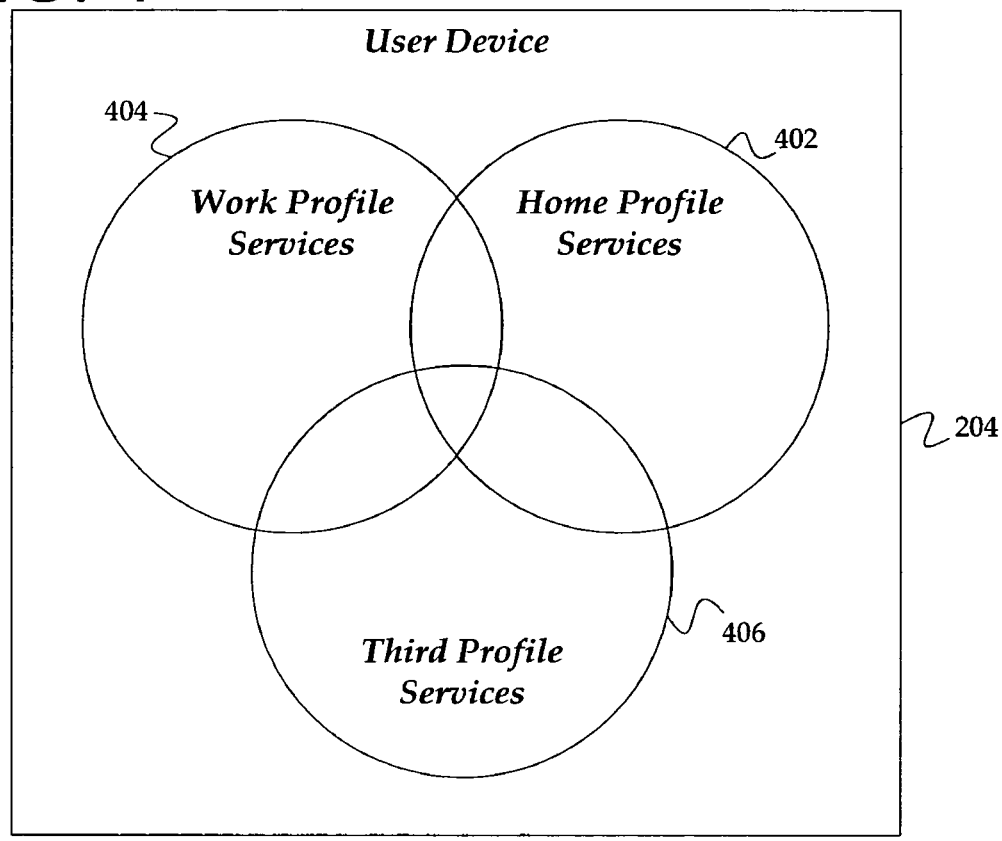
FIG. 4 is a block diagram illustrating a system according to an embodiment.

FIG. 4 is a block diagram illustrating a system according to an embodiment. In particular, FIG. 4 illustrates one embodiment of the sharing of services between profiles. As discussed above, a user may be associated with multiple service profiles. In one embodiment, a user has services associated with a home profile 402, a work profile 404, and a third profile 406. The user device 204 may include any number of profiles with services that may be interchangeable/shared and services that are unique to one profile. Alternatively, a profile may be referred to as a persona. Examples of services are discussed below in FIG. 5.

As shown in FIG. 4, each of the profiles may share services with the other profiles. Services may refer to any of the applications, preferences, policies, data or other information that may associated with a profile. In particular, the home profile 402 may share services with the work profile 404, the third profile 406, and services that are present in both the work profile 404 and the third profile 406. As illustrated, this is merely one example of the sharing of services. In alternate embodiments, there may be fewer or more profiles that share services. Some services may not be shared and other services may only be shared between certain profiles. FIG. 4 is illustrative of the potential overlap and sharing between three profiles.

Figure 5:
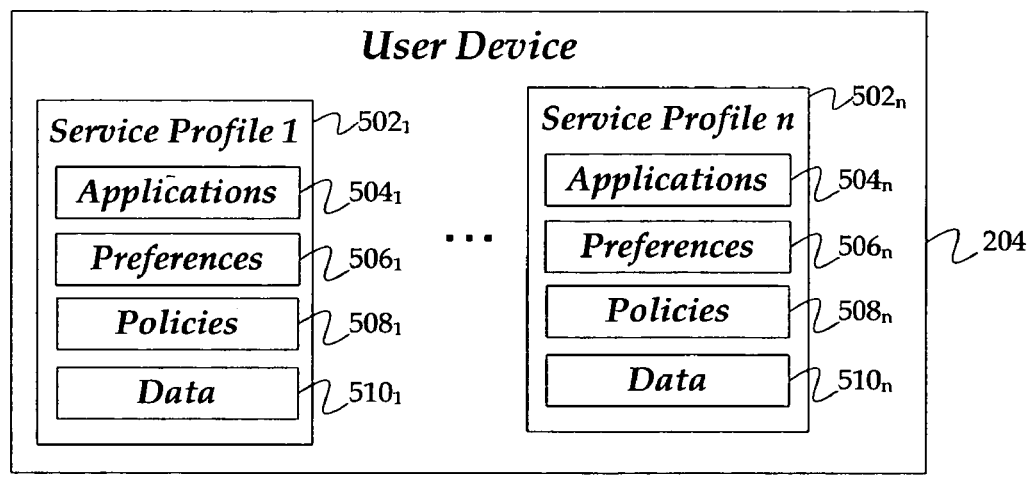
FIG. 5 is a block diagram illustrating a system according to an embodiment.

FIG. 5 is a block diagram illustrating a system according to an embodiment. In particular, FIG. 5 illustrates one embodiment of a user device 204 with multiple profiles. The user device 204 may be a computer system and/or include a processor, memory, and/or user interface elements as described in FIG. 10. Alternatively, the user device 204 may be a user interface as shown in FIG. 8 or in FIG. 9. The memory may store data and instructions for processing by the processor. The user interface may include features such as a speaker and microphone, keypad and display. In conjunction with the user interface, the processor and information stored in the memory may provide a variety of services, such as communication services.

As shown in FIG. 5, there may be n service profiles from service profile 1 $502_1$ to service profile n $502_n$. The value of n may be any number, including 1. FIG. 5 illustrates the potential services available for a particular profile such as service profile 1 $502_1$ including services such as applications $504_1$, user preferences $506_1$, established policies $508_1$ and data $510_1$. In addition, any of the n service profiles $502_n$ may include similar services such as applications $504_n$, user preferences $506_n$, established policies $508_n$ and data $510_n$.

Applications 504 may include software applications that run on the user device 204. Certain applications 504 may only be accessible for a particular profile. For example, a software program for entering worked time may only be available to a work profile and not a home profile. An application that may be shared between profiles may be voice activated dial. The Voice activated dial may be associated with a user's home profile, but the user may choose to have the voice activated dial available to the user's work profile. Preferences 506 may include the preferences or settings that a user has identified for a particular profile. For example, a list of the most used programs or applications may be different for different profiles. Policies 508 may include the operation of the user device 204. Policies 508 may be interchangeable with preferences 506. For example, the user may utilize FindMeFollowMe preferences that establish access to a user. Co-workers may get access during the working day, but a spouse does not get immediate access and during non-working hours, the reverse may be true. Accordingly, the policies 508 are different depending on the service profile. Finally, data 510 may be different depending on the service profile. In particular, certain data may only be available to a subset of the profiles. For example, confidential, work-related data may only be available to the work service profile. Additionally, an address book may be unique between service profiles. A work service profile may include co-worker addresses, but not personal addresses. However, a user may determine that certain addresses should be accessible in multiple profiles, such as a spouse or boss available in all service profiles.

The services as shown in FIG. 5 may not be located solely on the user device 204. FIG. 5 illustrates that those services may be available to the user device 204, but not necessarily that the services be downloaded to the user device 204 and run exclusively from the user device 204. In one example, the execution of a service or profile may occur on both the user device 204 and within the network as discussed in FIG. 6.

Figure 6:
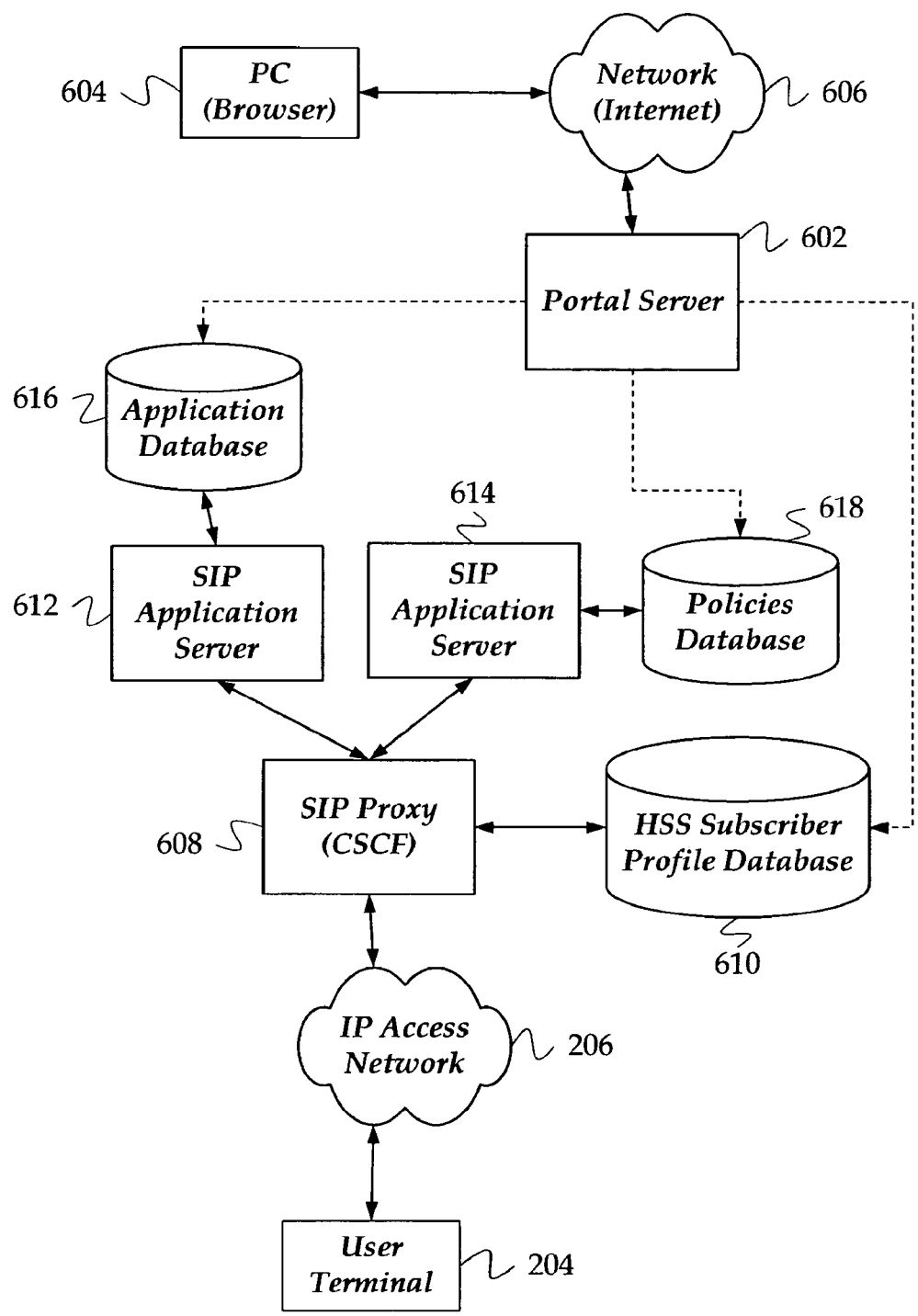
FIG. 6 is a block diagram illustrating a system according to an embodiment.

FIG. 6 is a block diagram illustrating a system according to an embodiment. A portal server 602 is coupled with an application database 616, policies database 618, and Home Subscriber Server ("HSS") Subscriber profile database 610. The HSS Subscriber database 610 is coupled with a SIP proxy 608. The application database 616 and policies database 618 are coupled with SIP application servers 612, 614, respectively, which are in turn coupled with the SIP proxy 608. A PC 604 may communicate with the portal server 602 through a network 606 and a user terminal 204 may connect with the SIP proxy 608 through an IP access network 206.

The Home Subscriber Server ("HSS") database 610 stores the user's service profile, such as the services the user is subscribed to, what application servers 612, 614 implement the service, etc. The HSS database 610 may also include a call state control function ("CSCF"), which is a term used in the IP Multimedia subsystem ("IMS") standards. HSS may represent a database function, while the CSCF represents a switching function. The CSCF interacts with the HSS to determine the user's service profile, and uses this to invoke the application servers 612, 614 in some sequence. When a server proxy 608 (or switch) executes the service profile, it invokes those application servers 612, 614. The HSS database 610 is provisioned by updating the service profile data. This updating/provisioning may happen either through a customer care center application, an interactive voice response (IVR)-based application or a user self-managing their service profile through a portal application.

The PC 604 may be a personal computer coupled with the portal server 602 through network 606. The PC 604 may have a browser through which a user may edit or manage his/her service profile through the browser connection with the portal server 602. Various aspects of the service profile including any of the services, such as applications, preferences, policies, or data may be edited or modified. The PC 604 may be coupled with the portal server 602 through a network 606. The network may be an access network or a core network as discussed above. The PC 604 may include a graphical user interface ("GUI") that allows a user to input any of the applications 504, preferences 506, policies 508, or data 510 for any of the service profiles 502. In particular, the GUI may operate as an interface with the user, or a user device, such as user device 204 and portal server 602. The portal server 602 may be a web portal similar to YAHOO! or MSN that allows the user the ability to configure the service profiles. Depending on the service profile 502 of the user device 204, the relevant applications 504, preferences 506, policies 508, or data 510 may be accessible. Alternatively, the user terminal 204, or the PC 604 may be the same device or associated with the same user.

As shown, the portal server 602 may access the application database 616, the policies database 618, or the HSS Subscriber Profile Database 610 as discussed above. The application database 616 may include the applications 504 that are available to a particular profile. The application database 616 includes application-specific data, but the HSS database 610 may determine what applications are available to a user with a particular service profile. Likewise, the policies database 618 may include the polices 508 that are available to a particular profile. The portal server 602 may provide a mechanism through which any of the databases 610, 616, or 618 may be edited. The databases 610, 616, or 618 further provide relevant profile information to the SIP proxy 608 when a user, such as with user terminal 204 connects with the system.

The SIP proxy 608 is coupled with the profile database to receive the profile information for the user terminal 204 upon the user terminal 204 logging into the SIP proxy 608 through the IP access network 206. The SIP proxy 608 may be coupled with SIP application servers 612, 614 which allow access to the application database 616 and the policies database 618, respectively.

In one example, an application like Voice Activated Dial may be shared between a work profile and a home profile. In one example, the service profile HSS database 610 may be provisioned through a portal server 602 when a user elects to share the application. The SIP proxy 608 allows this application to be executed when the user terminal 204 is registered with the work profile. Similarly, a user's address book may contain (or refer to) data from both his home-profile address book, as well as some subset of his corporate directory or work-profile address book. This data may be stored in the network. As a third example, policies regarding which profile is applied may be dictated by a network-based policy manager coordinating with the client.

FIG. 7 is a flow diagram illustrating a method according to an embodiment. IMS may provide a mechanism in software for switching out of a service profile into another service profile, similar to the switching of a SIM card in a user device. FIG. 7 illustrates one mechanism for sharing services between profiles in IMS, a SIP-based network, or another network allowing multiple service profiles. Although FIG. 7 is described in terms of IMS, other networks may also utilize the following mechanism.

In block 702, the user logs into a portal server 602. In bock 704, the portal administration allows the user to choose a profile. In addition, the portal server 602 may allow the user to view or modify each available profile and the associated applications/preferences/policies/data for each profile. In block 706, an associated provisioning mechanism may update each of the associated home subscriber server ("HSS") profiles for the user in the HSS database 610. In other words, profiles may be updated.

In block 708, the user may share services from different service profiles. As described above in FIGS. 4 and 5, the services (applications, preferences, policies, data, etc.) for different profiles may be shared between profiles. In one embodiment, the data may be written out to a common data store or database used by different profiles or applications as in block 710. In block 712, preferences may establish which data applies to which profile. Alternatively, the profiles may share certain data, such as work and home contacts, which may be available in both a home profile and a work profile. Accordingly, in block 714, a user identifies policies and preferences for data sharing between profiles. A network address book may be governed by a policy or preference that is shared between profiles. In one embodiment, the home contacts may be the preferred contacts during non-working hours, while the work contacts may be the preferred contacts during working hours. In addition, the user may establish who is allowed to reach the user at particular times. In one example, the policies may be stored as XML rules that are enforced by a Service Mediation function when a request is received. In one embodiment, the request may be a SIP/Simple Subscribe/Notify request. A Service Mediation function may decide which applications are available based on user selections.

In block 716, the services that are available to a user may be shown in at least three different ways. As described above, the services that are available may include applications, policies, preferences, or data. Certain services may only be available to one profile, while other services may be shared. Accordingly, the services that are available to a user may be established in at least three ways. In block 718, icons for inactive services may be grayed-out after a profile switch. Accordingly, an application that is only available to a user in the work profile may be grayed out when the user switches to a home profile. In block 720, the authentication by a registered profile may establish the available services. As described in FIG. 2, a profile may be authenticated. In addition, the services may also be authenticated and this authentication may establish which services are available to a particular profile. If a user is in home profile and attempts to access data that is only available to the work profile, then that data access may not be authenticated. In block 722, the client icon may be changed based on the registered profile. For example, if an application is not available on a particular profile, then that application is automatically not displayed to the user, but if the user switches to a profile with the application available, then there may be an icon or link for that application.

FIG. 8 is a diagram illustrating one embodiment of a user interface 800. The user interface 800 includes a display 802 and a series of icons 804-814 representative of services that may be available. In particular, the icons app1 804, pref1 806, and pol1 808 represent an application, preference, and policy, respectively, each associated with a first service profile. Likewise, icons app2 810, pref2 812, and pol2 814 represent an application, preference, and policy, respectively, each associated with a second service profile. As shown, the user interface 800 is for a first service profile. Accordingly, the icons associated with the first service profile, app1 804, pref1 806, and pol1 808 are active icons. However, even though the first service profile is active, the icon pref2 812 is also active. Pref2 812 is an icon representing preferences associated with the second service profile, but is none-the-less available and being shared with the first service profile in user interface 800. Conversely, the icons app2 810 and pol2 814 are grayed out and not available, so the first service profile does not have access to the application and policy associated with the second service profile.

Active icons may be shown by being highlighted or in a different color. Inactive icons may be shown as being grayed-out or based on color. The inactive icons may include a symbol or other identifier that the service associated with that icon is not available. The symbol may be an X or lines that show the icon is unavailable.

User interface 800 is merely one example of a user interface. Alternatively, the user interface 800 may include more or fewer features. In particular, the icons for the user interface 800 may be arranged differently, and there may be more of fewer icons representing different services associated with different service profiles. FIG. 9 is an alternative embodiment of a user interface.

FIG. 9 is a diagram illustrating another embodiment of a user interface 900. User interface 900 is similar to user interface 800; however, the user interface 900 is for the second service profile. Accordingly, the icons associated with the second service profile, app2 910, pref2 912, and pol2 914 are all active. The app1 904, and pol1 908 icons are still available for the second service profile. However, the pref1 906 icon is grayed out indicating that the preferences associated with the first service profile are not available in the second service profile. Alternatively, different services may or may not be grayed out and available for different service profiles.

Figure 10:
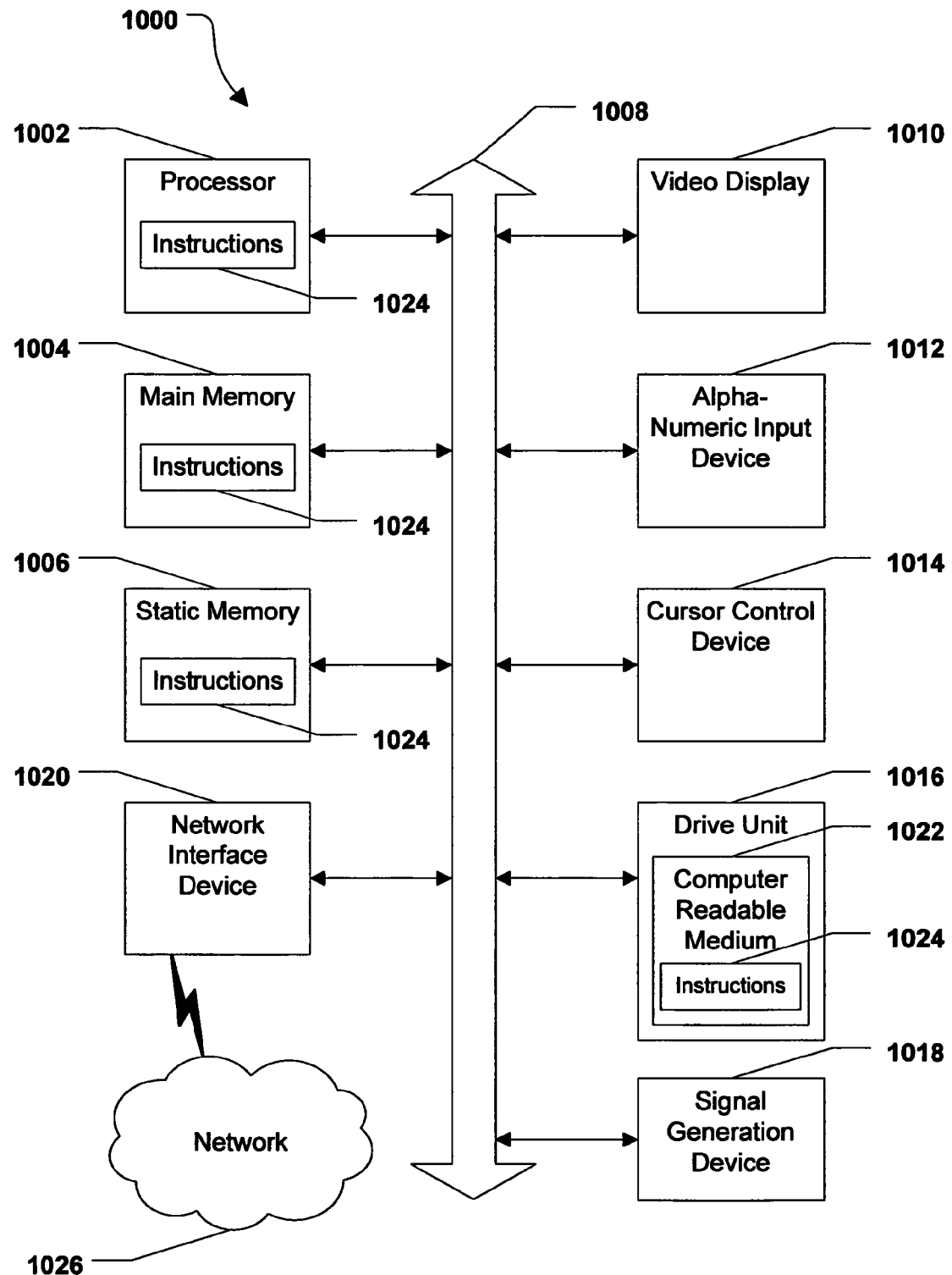
FIG. 10 is a block diagram illustrating a general computer system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. Any of the components discussed above may be a computer system 1000 or may be any of the components in the computer system 1000 described below.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

From the foregoing, it can be seen that the present method and system provides a way to associate multiple service profiles with a single user device. In addition, there may be a switch between the set of services offered to the device and services from one profile may be shared with other profiles.

The invention claimed is:

1. A method for sharing available services between multiple service profiles for a device comprising:
providing, by a processor, a first service profile and a second service profile for the device in a session initiation protocol based network, wherein the first service profile is associated with a first set of services and the second service profile is associated with a second set of services, wherein a service of the first set of services is not available in the second set of services, wherein the first service profile comprises a default profile that is registered automatically;
receiving, via the processor, a registration of the device with the second service profile over the session initiation protocol based network;
authenticating the device with an access network using a subscriber identity module; and
providing, via the processor, the service from the first set of services that is not available in the second set of services upon the registration of the second service profile, while the first service profile is unregistered, wherein services that are unavailable are grayed out on the device.

2. The method of claim 1 further comprising providing a second service from the second set of services upon the registration of the first service profile.

3. The method of claim 1 wherein the first set of services includes services in the second set of services.

4. The method of claim 1 wherein the device comprises a telecommunications device.

5. The method of claim 1 wherein the session initiation protocol-based network is a next-generation network.

6. The method of claim 5 wherein the next generation network is an internet protocol subsystem network.

7. The method of claim 1 wherein the access network is in communication with the session initiation protocol-based network.

8. The method of claim 1 wherein the available services comprise applications.

9. The method of claim 8 wherein the available services are authenticated.

10. The method of claim 1 wherein the first service profile is a work profile and the second service profile is a home profile.

11. The method of claim 1 wherein the registration of the device comprises using a session initiation protocol proxy.

12. A non-transitory computer-readable medium storing instructions which, when executed by a processor, cause the processor to perform operations, the operations comprising:
providing a first persona and a second persona for a device in a session initiation protocol based network, wherein the first persona is associated with a first set of services and the second persona is associated with a second set of services, wherein a service of the second set of services is not available in the first set of services, wherein the first service profile comprises a default profile that is registered automatically;
receiving a registration with the first persona over the session initiation protocol based network;
authenticating the device with an access network using a subscriber identity module;
sharing the service from the second set of services that is not available in the first set of services with the first persona upon the registration of the first persona, while the second persona is unregistered, wherein the sharing comprises graying out unavailable services.

13. The non-transitory computer readable medium of claim 12 wherein the first set and second set of services comprise applications.

14. A method for receiving available services between multiple service profiles for a device comprising:
receiving, by a processor of the device, access to a first service profile and a second service profile in a session initiation protocol based network, wherein the first service profile is associated with a first set of services and the second service profile is associated with a second set of services, wherein a service of the first set of services is not available in the second set of services, wherein the first service profile comprises a default profile that is registered automatically;
registering, by the processor, the device with the second service profile over the session initiation protocol based network;
authenticating the device with an access network using a subscriber identity module; and
accessing, by the processor, the service from the first set of services that is not available in the second set of services upon the registration of the second service profile, while the first service profile is unregistered, wherein services from the first set of services that are not available upon registration of the second profile are represented by grayed out icons.

15. A method for displaying available services from multiple service profiles for a device comprising:
providing, by a processor, a first service profile and a second service profile for the device in a session initiation protocol based network, wherein the first service profile is associated with a first set of services and the second service profile is associated with a second set of services, wherein a service of the first set of services is not available in the second set of services, wherein the first service profile comprises a default profile that is registered automatically;

receiving, via the processor, a registration for the second service profile and deregistering the first service profile;

authenticating the device with an access network using a subscriber identity module; and displaying, via the processor, icons associated with the service from the first set of services that is not available in the second set of services, wherein unavailable services from either the first set of services or the second set of services are displayed as unavailable, wherein the unavailable services are displayed as grayed-out icons, and the available services are displayed as active icons.

16. A communications system comprising:

a processor; and a computer-readable medium storing a plurality of instructions which, when executed by the processor, cause the processor to perform operations, the operations comprising:

providing a first service profile and a second service profile for a device in a session initiation protocol based network, wherein the first service profile is associated with a first set of services and the second service profile is associated with a second set of services, wherein a service of the first set of services is not available in the second set of services, wherein the first service profile comprises a default profile that is registered automatically;

receiving a registration for the second service profile and deregistering the first service profile;

authenticating the device with an access network using a subscriber identity module; and displaying icons associated with the service from the first set of services that is not available in the second set of services, wherein unavailable services from either the first set of services or the second set of services are displayed as unavailable, wherein the unavailable services are displayed as grayed-out icons, and available services are displayed as active icons.

17. The communications system of claim 16, further comprising:

transmitting the registration.

18. The communications system of claim 16, wherein the first and the second sets of services comprise an application.

19. The communications system of claim 16, wherein the first service profile is a home profile and the second service profile is a work profile.

20. The communications system of claim 16, wherein the session initiation protocol based network is an internet protocol multimedia subsystem network.

* * * * *